F. C. BIGGERT, Jr.
CLUTCH MECHANISM.
APPLICATION FILED MAY 12, 1908.
958,710.
Patented May 17, 1910.
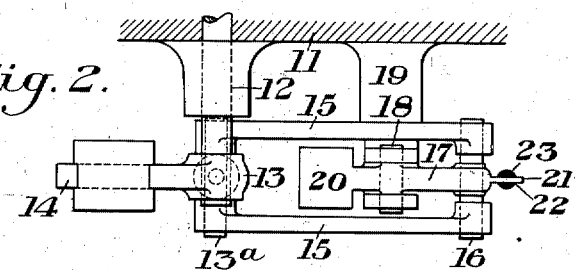
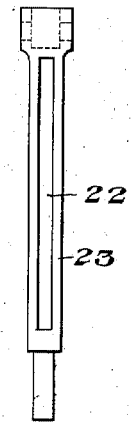
Fig. 3.
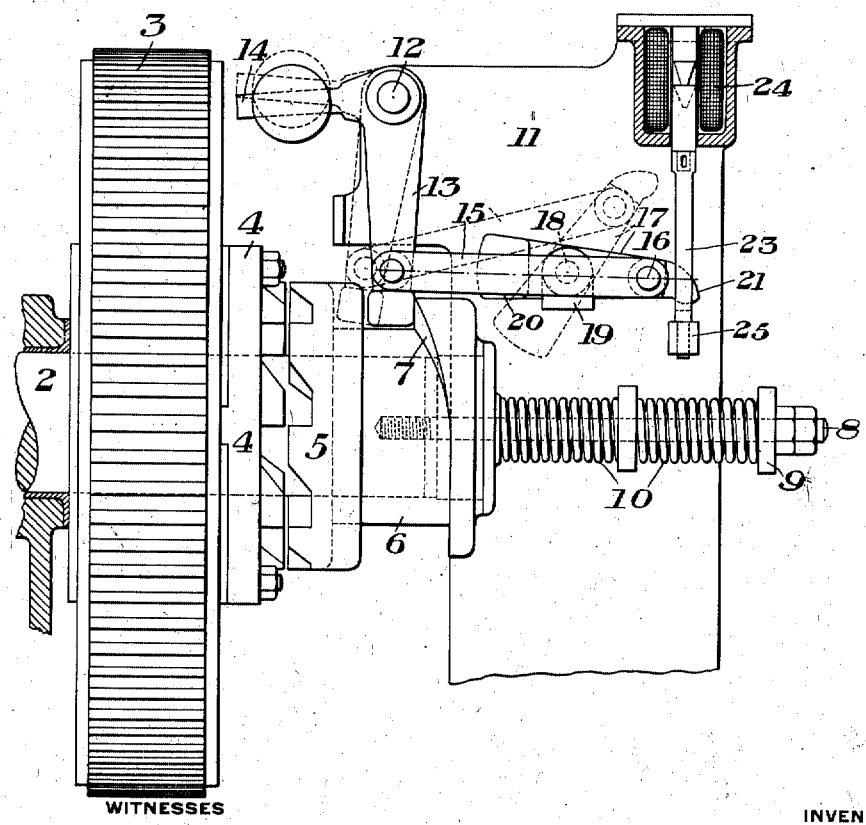
Fig. 1.
WITNESSES
R H Balderson
H W Corwin
INVENTOR
F. C. Biggert, Jr.
by Bakewell, Byrnes & Parmelee,
his Attys.

UNITED STATES PATENT OFFICE.

FLORENCE C. BIGGERT, JR., OF PITTSBURG, PENNSYLVANIA, ASSIGNOR TO UNITED ENGINEERING & FOUNDRY COMPANY, OF PITTSBURG, PENNSYLVANIA, A CORPORATION OF PENNSYLVANIA.

CLUTCH MECHANISM.

958,710.  Specification of Letters Patent.  Patented May 17, 1910.

Application filed May 12, 1908. Serial No. 432,373.

*To all whom it may concern:*

Be it known that I, FLORENCE C. BIGGERT, Jr., of Pittsburg, Allegheny county, Pennsylvania, have invented a new and useful Clutch Mechanism, of which the following is a full, clear, and exact description, reference being had to the accompanying drawings, forming part of this specification, in which—

Figure 1 is a plan view of one form of clutch mechanism embodying my invention; Fig. 2 is a plan view of a portion of the same; and Fig. 3 is a detail view of the magnet rod or plunger.

My invention has relation to clutch mechanism, and has been more particularly designed to provide mechanism of this character designed for use in connection with machines, such as shearing machines, which have an intermittent operation, although it may be used for a variety of other purposes.

The object of my invention is to provide clutch mechanism of simple character, in which the clutch can be thrown into operation at the proper time with the expenditure of but very little power.

In accordance with my invention, I provide means, preferably a spring, for throwing the clutch into operation, and cam means for throwing the clutch out of operation, the spring or other means for throwing in the clutch being normally prevented from operation by an electro-magnetically controlled latch or locking device.

The precise nature of my invention will be best understood by reference to the accompanying drawings, in which I have shown one form thereof, and which will now be described, it being premised, however, that various changes may be made therein by those skilled in the art without departing from the spirit and scope of my invention as defined in the appended claims.

In these drawings, the numeral 2 designates an intermittently driven shaft, which may form part of any machine to be operated such as a shear. Loosely mounted on this shaft is a wheel 3, in the present instance a gear wheel, which is constantly driven from any suitable source. Fixed to one face of this wheel and rotating therewith loosely upon the shaft 2, is a clutch member 4. 5 is a coöperating clutch member having a hub portion 6 having a groove formed with a cam wall 7. The clutch member 5 is keyed to the shaft 2 to be rotated therewith but to be longitudinally movable thereon into and out of engagement with the clutch member 4. Secured to the end portion of the shaft 2, and projecting longitudinally therefrom, is a rod or bolt 8 having a washer 9 at its outer end portion and around which is seated a coil spring or springs 10, which exert a pressure against the outer end of the clutch member 5 in a direction to tend to hold the two clutch members 4 and 5 in clutch engagement with each other. Pivoted to the frame 11 of the machine at the point 12, is a lever 13 having one counterweighted arm 14. The other depending arm of this lever engages the groove in the hub portion 6 of the clutch member 5, and is designed to contact with and be actuated by the cam wall 7 of such groove.

Pivoted at 13ª to the lower portion of the depending arm of the lever 13 are two horizontally extending bars or levers 15, which are connected at their free end portions by a pin 16.

17 is a latch member, which is fulcrumed at 18 on a pin or stud carried by a bracket 19 of the frame 11. The latch member 17 is counterweighted at one end as indicated at 20, and its opposite end portion is engaged by the pin 16, with a nose 21 projecting into engagement with a vertical slot 22 in a rod or plunger 23. The upper end of this rod or plunger extends within and forms the core of the solenoid magnet 24, while its lower end portion is provided with a suitable guide 25.

The operation is as follows:—With the parts in the position shown in Fig. 1, the relation of the three centers 13ª, 16 and 18 is such that the bars 15 are locked against endwise movement by the latch member 17, the pin or center 16 being forced slightly below the line of the centers 13ª and 18. Therefore, as the clutch section 5 revolves with the clutch section 4, the engagement of the cam wall 7 with the lower end of the depending arm of the lever 13 will act to withdraw the clutch member 5 from engagement with the clutch member 4. This withdrawal effects a compression of the spring or springs 10. The clutch member 5 will remain in this withdrawn position until such time as the magnet 24 is energized. When this occurs the rod or plunger 23 will be suddenly drawn upward thereby moving the latch member 17 sufficiently to raise the center 16 above the center 18. This releases the lock for the lever 13, and the spring 10 immediately throws the parts to the position shown in dotted lines in Fig. 1 and moves the clutch member 5 into engagement with the clutch member 4. The lever 13, bars 15 and latch members 17, then return to their locking positions by their unbalanced weight, so that after the wheel 3 has made one complete revolution the cam wall 7 will act to again retract the clutch member 5.

The advantages of my invention result from the simplicity of the arrangement as a whole, and from the fact that all the power which is necessary to throw the clutch in, aside from that of the spring or springs 10, is sufficient current to energize the solenoid magnet 24, which magnet can be energized either manually or automatically for each operation of the machine, and in any desired manner.

It will be obvious that various changes may be made in the construction and arrangement of the parts. Thus various forms of latch and locking devices may be used, which will be capable of being released by the action of the magnet; the arrangement of the magnet may itself be changed, and any suitable solenoid or armature operative connection may be employed for releasing the latch member.

What I claim is:—

1. In clutch mechanism, the combination of two coöperating clutch members, one of which is movable into and out of clutching engagement with the other member, a spring for normally forcing said member into clutching engagement, said movable member having a cam, a lever having a member arranged to be engaged by said cam, a second lever, a link connecting the levers and arranged to lock the cam-engaging member in rigid relation to the cam, and means for releasing the locking levers to permit the movable clutch member to be moved into clutching engagement; substantially as described.

2. In clutch mechanism, the combination of two coöperating clutch members, one of which is movable into and out of clutching engagement with the other, means for forcing said member into clutching engagement, said movable member having a cam, a member arranged to be engaged by said cam, means to shift the cam engaging member in line of movement of the movable clutch member to shift the movable clutch member out of engagement with the other clutch member, and means for locking the cam engaging member in its shifted position; substantially as described.

3. In clutch mechanism, the combination of two coöperating clutch members, one of which is movable into and out of clutching engagement with the other member, means for forcing said member into clutching engagement, said movable member having a cam, a lever pivoted so as to swing in line with the axis of the clutch members and arranged to be engaged by said cam, a pair of toggle levers pivoted to each other, one of the toggle levers being pivoted to a stationary member, the other toggle lever being connected to the cam engaging lever and arranged to move said lever, and means to move the toggle levers into and out of locking relation to each other; substantially as described.

4. In clutch mechanism, the combination of two coöperating clutch members, one of which is movable into and out of clutch engagement with the other member, means for forcing said member into clutching engagement, a lever arranged to swing in line with the axis of the clutch members, cam means on the movable clutch member arranged to engage said lever to retract said member, locking means for holding the lever in position to effect such retraction, and electromagnetic means for releasing the locking device; substantially as described.

5. In clutch mechanism, the combination of two coöperating clutch members, one of which is movable into and out of clutching engagement with the other member, the movable member having a hub portion provided with a cam surface, a lever movable along the axis of the clutch members and arranged to be engaged by said cam surface to effect the retraction of said member, a latch device connected to said lever and arranged to normally hold the same in position to retract and hold the movable clutch member in retracted position, an electromagnet, and means operated thereby for releasing the latch member; substantially as described.

6. In clutch mechanism the combination of two coöperating clutch members, one of which is movable into and out of clutching engagement with the other member, means for forcing said member into clutching engagement, said movable member having a cam, a member arranged to be engaged by said cam, means to shift the cam engaging member in line of movement of the movable clutch member to shift the movable clutch member from engagement with the other clutch member, means to lock the cam engaging member in its shifted position, and electro-mechanically controlled means for releasing the locking means; substantially as described.

7. In clutch mechanism, the combination of two coöperating clutch members, one of which is movable into and out of clutching for forcing said member into clutching engagement, said movable member having a cam, a lever pivoted so as to swing in line with the axis of the clutch members and arranged to be engaged by said cam, a locking device for said lever having a toggle joint, means to move the locking device into position to lock the cam engaging lever in rigid relation to the cam, and means for moving the locking device to break the toggle joint thereof to allow the clutch members to engage each other; substantially as described.

8. In chute mechanism, the combination of two coöperating clutch members, one of which is movable into and out of clutching engagement with the other member, means for forcing said member into clutching engagement, said movable member having a cam, a lever pivoted so as to swing in line with the axis of the clutch members and arranged to be engaged by said cam, a pair of toggle levers pivoted to each other, one of the toggle levers being pivoted to a stationary member, the other toggle lever being connected to the cam engaging lever and arranged to move said lever, means to move the toggle levers into parallel relation to each other to disengage and lock the clutch members in their disengaged position, and electro-magnetically controlled means to move the toggle levers out of parallel relation to allow the clutch members to engage each other; substantially as described.

In testimony whereof, I have hereunto set my hand.

FLORENCE C. BIGGERT, JR.

Witnesses:
H. M. CORWIN,
GEO. H. PARMELEE.

Corrections in Letters Patent No. 958,710.

It is hereby certified that in Letters Patent No. 958,710, granted May 17, 1910, upon the application of Florence C. Biggert, Jr., of Pittsburg, Pennsylvania, for an improvement in "Clutch Mechanism" errors appear in the printed specification requiring correction as follows: Page 2, line 130, after the word "clutching" the words *engagement with the other member, means* should be inserted; and page 3, line 13, the word "chute" should read *clutch;* and that the said Letters Patent should be read with these corrections therein that the same may conform to the record of the case in the Patent Office.

Signed and sealed this 14th day of June, A. D., 1910.

[SEAL.]
C. C. BILLINGS,
*Acting Commissioner of Patents.*